(12) United States Patent
Shaubi et al.

(10) Patent No.: US 10,803,575 B2
(45) Date of Patent: *Oct. 13, 2020

(54) SYSTEM, METHOD AND COMPUTER PROGRAM PRODUCT FOR GENERATING A TRAINING SET FOR A CLASSIFIER

(71) Applicant: APPLIED MATERIALS ISRAEL LTD., Rehovot (IL)

(72) Inventors: Ohad Shaubi, Yavne (IL); Assaf Asbag, Alfei Menashe (IL); Idan Kaizerman, Meitar (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,589

(22) Filed: Jul. 22, 2019

(65) Prior Publication Data

US 2019/0347785 A1 Nov. 14, 2019

Related U.S. Application Data

(63) Continuation of application No. 15/685,974, filed on Aug. 24, 2017, now Pat. No. 10,360,669.

(51) Int. Cl.
*G06K 9/00* (2006.01)
*G06T 7/00* (2017.01)
(Continued)

(52) U.S. Cl.
CPC ............ *G06T 7/0004* (2013.01); *G05B 23/00* (2013.01); *G06K 9/6256* (2013.01); *G06K 9/6262* (2013.01); *G06K 9/6269* (2013.01); *G06N 20/00* (2019.01); *G06N 20/10* (2019.01); *G06N 20/20* (2019.01); *G05B 23/0235* (2013.01); *G05B 2219/2602* (2013.01); *G05B 2219/37066* (2013.01); *G05B 2219/37224* (2013.01); *G05B 2219/37519* (2013.01);
(Continued)

(58) Field of Classification Search
CPC ..... G06T 7/0004; G06T 7/0012; G06T 7/001; G06T 2207/30148; G06N 99/005; G06N 3/08; G06K 9/62; G06K 9/685; G06K 9/033; G06K 9/6269; G06K 9/6256; G06K 9/6267; G06K 9/6262
See application file for complete search history.

(56) References Cited

U.S. PATENT DOCUMENTS

6,208,751 B1 * 3/2001 Almogy ............ H01L 21/67173
382/149
6,255,093 B1 7/2001 Schmuck et al.
(Continued)

*Primary Examiner* — Amir Alavi
(74) *Attorney, Agent, or Firm* — Lowenstein Sandler LLP (57) ABSTRACT

There is provided a system that includes a review tool configured to review at least part of potential defects of an examined object, and assign each of the at least part of the potential defects with a multiplicity of attribute values. The system also includes a computer-based classifier configured to classify, based on the attribute values as assigned, the at least part of potential defects into a set of classes, the set comprising at least a first major class, a second major class and a first minor class, the classifier trained based on a training set comprising a multiplicity of training defects with assigned attribute values, the training defects classified into the set of classes.

20 Claims, 7 Drawing Sheets

(51) Int. Cl.

| | |
|---|---|
| *G06K 9/62* | (2006.01) |
| *G06N 20/00* | (2019.01) |
| *G06N 20/10* | (2019.01) |
| *G06N 20/20* | (2019.01) |
| *G05B 23/00* | (2006.01) |
| *G05B 23/02* | (2006.01) |

(52) U.S. Cl.
CPC ............ *G05B 2219/40565* (2013.01); *G06T 2207/20081* (2013.01); *G06T 2207/30148* (2013.01)

(56) References Cited

U.S. PATENT DOCUMENTS

| | | | |
|---|---|---|---|
| 7,991,217 B2* | 8/2011 | Nakagaki | G06K 9/6256 382/144 |
| 8,150,141 B2* | 4/2012 | Nakagaki | G06K 9/6256 382/144 |
| 8,249,830 B2* | 8/2012 | Minhas | G05B 23/0283 702/185 |
| 8,315,453 B2* | 11/2012 | Shlain | G06K 9/6256 382/149 |
| 8,452,076 B2* | 5/2013 | Nakagaki | G06K 9/6256 382/144 |
| 9,286,675 B1 | 3/2016 | Shabtay et al. | |
| 9,964,607 B1* | 5/2018 | Propes | G06K 9/4628 |
| 10,360,669 B2* | 7/2019 | Shaubi | G06K 9/6262 |
| 2003/0228049 A1* | 12/2003 | Asai | G06T 7/0002 382/145 |
| 2015/0254832 A1* | 9/2015 | Plihal | G06T 7/001 382/149 |
| 2017/0144378 A1* | 5/2017 | Giera | G05B 13/0265 |

\* cited by examiner

SYSTEM, METHOD AND COMPUTER PROGRAM PRODUCT FOR GENERATING A TRAINING SET FOR A CLASSIFIER

RELATED APPLICATIONS

This application is a continuation application of co-pending U.S. patent application Ser. No. 15/685,974, filed Aug. 24, 2017, which is herein incorporated by reference.

TECHNICAL FIELD

The presently disclosed subject matter relates to examining objects (e.g. wafers, reticles, etc.) and more particularly to generating a training set for a classifier, for classifying defects detected by using captured images of the objects.

BACKGROUND

The term "object" used in this specification should be expansively construed to cover any kind or specimen of wafers, masks, reticles and other structures, combinations and/or parts thereof used for manufacturing semiconductor integrated circuits, magnetic heads, flat panel displays, and other semiconductor-fabricated articles. Various objects such as semiconductor wafers, printed circuit boards, solar panels and micro-electromechanical devices are fabricated by manufacturing processes that are highly complex, comprise multiple stages, and require highly accurate machines.

The term "defect" used in this specification should be expansively construed to cover any kind of abnormality or undesirable feature formed on or within a wafer.

The complex manufacturing process of objects is not error-free and such errors may cause faults in the manufactured objects. The faults may include defects that can harm operation of the object, and nuisances, which may be defects, but do not cause any harm or malfunction of the manufactured unit. By way of non-limiting examples, defects may be caused during the manufacturing process, due to faults in the raw material; mechanical, electrical or optical errors; human errors or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, defects may be classified into one of a number of classes, such as a particle, a scratch, process, or the like.

Unless specifically stated otherwise, the term "examination" used in this specification should be expansively construed to cover any kind of detection and/or classification of defects in an object. Examination is provided by using non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification are not limited with respect to the size of the inspected area(s), to the speed or resolution of the scanning or to the type of examination tools. A variety of non-destructive examination tools includes, by way of non-limiting example, optical tools, scanning electron microscopes, atomic force microscopes, etc.

Examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least part of defects detected during the inspection phase are, typically, captured at relatively low speed and/or high-resolution, thereby enabling classification and, optionally, other analyses of the at least part of defects. In some cases both phases can be implemented by the same inspection tool, and, in some other cases, these two phases are implemented by different inspection tools.

GENERAL DESCRIPTION

In accordance with certain aspects of the presently disclosed subject matter, there is provided an examination system comprising: a review tool configured to review at least part of potential defects of an examined object, and assign each of the at least part of the potential defects with a multiplicity of attribute values; and a computer-based classifier configured to classify, based on the attribute values as assigned, the at least part of potential defects into a set of classes, the set comprising a first major class, a second major class and a first minor class, the classifier further configured to operate in a training mode and be trained based on a training set, wherein during a training mode the classifier is configured to: receive the training set comprising a multiplicity of training defects with assigned attribute values, the training defects externally classified into the set of classes; train a classifier upon the training set; automatically classify the multiplicity of training defects into the set of classes based on the respectively assigned attribute values; automatically identify a first defect from the multiplicity of training defects that was externally classified into the first major class and classified by the classifier into the second major class; automatically identify a second defect from the multiplicity of training defects that was externally classified into the minor class and classified by the classifier to a class selected from the first major class and the second major class; and correct the training set to include the first defect into the second major class or to include the second defect into the first major class or the second major class. Within the system, the classifier is optionally comprised in the review tool. Within the system, the classifier is optionally implemented in a separate computing node. Within the system, classification of the training defects is optionally done automatically. Within the system, the classifier is further configured to retraining the classifier using the corrected training set. Within the system, the classifier is optionally further configured to provide indications to a user regarding the first defect or the second defect, and receive from the user classification of the first defect to the second major class or classification of the second defect to the first major class or to the second major class. Within the system, the indications are optionally provided along with an image of the first defect or the second defect.

In accordance with further aspects of the presently disclosed subject matter, there is provided a computer software product, comprising a non-transitory computer-readable medium in which program instructions are stored, which instructions, when read by a computer, cause the computer to: receive a training set comprising a multiplicity of training defects each having assigned attribute values, the multiplicity of training defects externally classified into a set of classes comprising a first major class, a second major class and a first minor class; training a classifier upon the training set; receive results of automatic classification by a classifier of the multiplicity of training defects into the set of classes, the automatic classification based on the attribute values; automatically identify a first defect from the multiplicity of training defects that was externally classified into the first major class and automatically classified into the second major class; automatically identify a second defect from the multiplicity of training defects that was externally classified into the minor class and automatically classified to a class selected from the first major class and the second major class; and correct the training set to include the first defect into the second major class, or to include the second defect into the first major class or the second major class.

In accordance with further aspects of the presently disclosed subject matter, there is provided a method of generating a training set for a classifier using a processor operatively connected to a memory, the method comprising: receiving by the processor a training set comprising a multiplicity of training defects each having assigned attribute values, the multiplicity of training defects externally classified into a set of classes comprising a first major class, a second major class and a first minor class; training by the processor a classifier upon the training set; receiving by the processor results of automatic classification by a classifier of the multiplicity of training defects into the set of classes, the automatic classification based on the attribute values; automatically identifying by the processor a first defect from the multiplicity of training defects that was externally classified into the first major class and automatically classified into the second major class; automatically identifying by the processor a second defect from the multiplicity of training defects that was externally classified into the minor class and automatically classified to a class selected from the first major class and the second major class; and correcting by the processor the training set to include the first defect into the second major class, or to include the second defect into the first major class or the second major class. The method can further comprise retraining by the processor the classifier using the corrected training set. The method can further comprise providing indications to a user regarding the first defect or the second defect, and receiving from the user classification of the first defect to the second major class or classification of the second defect to the first major class or to the second major class. Within the method, the indications are optionally provided along with a confidence level. Within the method, the indications are optionally provided along with an image of the first defect or the second defect. Within the method, the first defect is optionally identified based on a global effect of classifying the defect to the first major class on the automatic classification. Within the method, the global effect is optionally an effect of the defect on partitioning planes including a partitioning plane between the first class and the second class. Within the method, the first defect is optionally identified based on presence of a multiplicity of defects from the training set in the vicinity of the first defect within a space defined by the attributes, being initially classified to the second major class. Within the method, the first defect is optionally identified based on a combination of global effect of the first defect on the classifier, and presence of a multiplicity of defects in the vicinity of the first defect being manually classified to the second major class. Within the method, the second defect is optionally identified subject to being within a dense area of defects classified to the first major class or the second major class within an attribute space defined by at least part of the multiplicity of attributes. Within the method, the first defect or the second defect is optionally identified using a two dimensional confusion matrix having an entry in one dimension for each major class and each minor class, and an entry in another dimension for each major class. The method can further comprise classifying further defects using the classifier.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "determining", "calculating", "processing", "computing", "representing", "comparing", "generating", "assessing", "matching", "processing", "selecting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, ADI system and parts thereof disclosed in the present application.

The term "classification" used in this specification should be expansively construed to cover any kind of assigning items into a collection of classes, such that each item is assigned to one class. The classes can be defined by a user or otherwise received. A training set can also be received, which comprises a collection of items and the class to which each item is assigned. A classifier can then be trained upon the training set, such that further items can be classified in runtime according to their similarity or dissimilarity to items from the training set or to characteristics of the classes determined on the training.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
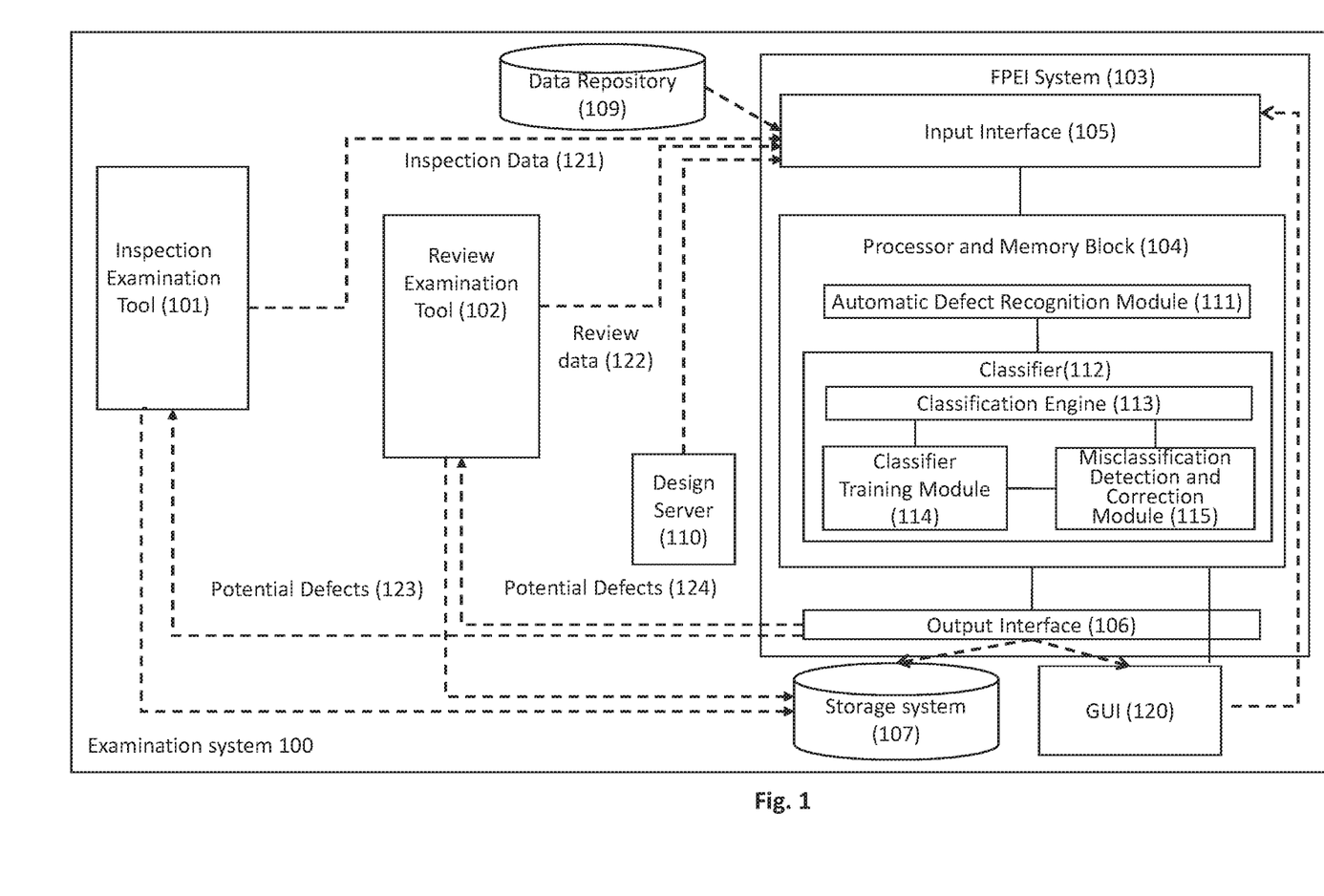
FIG. 1 illustrates a block diagram of an examination system, in accordance with certain embodiments of the presently disclosed subject matter.

Bearing this in mind, attention is drawn to FIG. 1 illustrating a generalized block diagram of an examination system in accordance with certain embodiments of the presently disclosed subject matter. Examination system 100 illustrated in FIG. 1 can be used for examination of an object (e.g. of a wafer and/or parts thereof) as a part of specimen fabrication. The examination can be a part of the object fabrication and can be carried out during manufacturing the object or afterwards. Examination system 100 comprises computer-based system 103 capable of automatically determining metrology-related and/or defect-related information using images obtained during or after object fabrication (referred to hereinafter as fabrication process (FP) images) and/or derivatives thereof. The system 103 is referred to hereinafter as FPEI (Fabrication Process Examination Information) system. FPEI system 103 can be operatively connected to one or more inspection examination tools 101 and/or one or more review tools 102. Inspection tools 101 are configured to capture inspection images (typically, at relatively high-speed and/or low-resolution). Review tools 102 are configured to capture review images of at least part of defects detected by inspection tools 101 (typically, at relatively low-speed and/or high-resolution). FPEI system 103 can be further operatively connected to design server 110 and data repository 109.

An object can be examined by inspection tool 101 (e.g. an optical inspection system, low-resolution SEM, etc.). The resulting images and/or derivatives thereof informative of revealed potential defects (collectively referred to hereinafter as inspection data 121) can be transmitted—directly or via one or more intermediate systems—to FPEI system 103. As further detailed below, FPEI system is configured to receive, via input interface 105, data produced by inspection tool 101 and/or data stored in one or more data repositories 109 and/or in design server 110 and/or another relevant data depository. Inspection data 121 can be indicative of locations of potential defects and other attributes thereof.

FPEI system 103 is further configured to process the received data and send, via output interface 106, the results (or part thereof) to a storage system 107, to examination tool(s), to a computer-based graphical user interface (GUI) 120 for rendering the results and/or to external systems (e.g. Yield Management System (YMS) of a FAB, recipe node, etc). GUI 120 can be further configured to enable user-specified inputs related to operating FPEI system 103.

FPEI system 103 can be configured to process the received inspection data 121 (optionally together with other data as, for example, design data and/or defect classification data) to select potential defects for review.

FPEI system 103 can send the processing results (e.g. potential defects or instruction-related data 123 and/or 124) to any of the examination tool(s), store the results (e.g. defect classification) in storage system 107, render the results via GUI 108 and/or send to an external system (e.g. to YMS, recipe node, etc.).

The object can be further examined by review tool 102. A subset of potential defect locations selected for review in accordance with data generated by FPEI 103 can be reviewed by a Scanning Electron Microscope (SEM), Atomic Force Microscope (AFM), etc. The resulting data (referred to hereinafter as review data 122) informative of high-resolution images and/or derivatives thereof can be transmitted—directly or via one or more intermediate systems—to FPEI system 103 and can be used for further selection of potential defects for review, classifying the reviewed defects, etc.

FPEI system 103 comprises a processor and memory block (PMB) 104 operatively connected to a hardware-based input interface 105 and to a hardware-based output interface 106. PMB 104 is configured to provide processing necessary for operating FPEI system 103 and comprises a processor (not shown separately) and a memory (not shown separately). The processor of PMB 104 can be configured to execute several functional modules in accordance with computer-readable instructions implemented on a non-transitory computer-readable memory comprised in PMB 104. Such functional modules are referred to hereinafter as comprised in PMB 104. Functional modules comprised in PMB 104 include automatic defect recognition module 111, and classifier 112, comprising classification engine 113, classifier training module 114, and misclassification detection and correction module 115. The functional modules comprised in the PMB 104 are further detailed with reference to FIGS. 2A and 2B below.

It is noted that the examination system illustrated in FIG. 1 can be distributed over several local and/or remote devices, and can be linked through a communication network. It is further noted that in other embodiments at least part of examination tools 101 and/or 102, data repositories 109, storage system 107 and/or GUI 120 can be external to the examination system 100 and operate in data communication with FPEI system 103 via input interface 105 and output interface 106. FPEI system 103 can be implemented as stand-alone computer(s) to be used in conjunction with the examination tools. Alternatively, the respective functions of FPEI system 103 can, at least partly, be integrated with one or more examination tools, process control tools, recipe generation tools, systems for automatic defects review and/or classification, and/or other systems related to examination.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

When examining objects, each defect can be characterized by values assigned to a multiplicity of attributes, such as but not limited to size, color, background color, context of appearance, shape, texture. A classifier can be trained and classification can be based on the vicinity between items, or on the vicinity between an item and characteristics of the classes. Vicinity can be defined in accordance with an applicable distance function, for example a distance defined in the attribute space and the possible values for each attribute. Classification methods and usage are disclosed, for example in U.S. Pat. No. 9,286,675 filed Oct. 23, 2014 and in U.S. Pat. No. 6,255,093 filed Jun. 25, 1998, both patents incorporated herein by reference in their entirety for all purposes.

Each defect can then be automatically classified into one of a number of classes, such as a particle, a scratch, process, or otherwise, based on its attribute values.

The true defects, and optionally additional ones, for example nuisances which are defects that cause no harm, can be expressed as or characterized by a collection of values assigned to a multiplicity of attributes, and can be classified, using classification engine 113 of classifier module 112 into one of a collection of predetermined classes.

Classification engine 113 can be trained by classifier training module 114 upon a training set, wherein following the training, classifier engine 113 can classify defects. The training set can comprise a multiplicity of defects, each expressed as a collection of attribute values assigned therewith, and an association of each of the defects to one of the classes. Association of the defects in the training set to the classes can be done manually by human operators, or received from any other external source, e.g. a previous classifier version or another classifier.

However, the defects in the training set can be imperfectly manually classified, for example due to human mistakes, defect ambiguity, or other reasons. In some environments, the error rate of the initial classification may be as high as 40%. It will be appreciated that a classifier trained on training data comprising significant percentage of mistakes cannot produce reliable classification of further defects.

Misclassification detection and correction module 115 can be configured to detect and correct misclassification errors, as detailed in association with FIGS. 2A and 2B below.

Figure 2A:
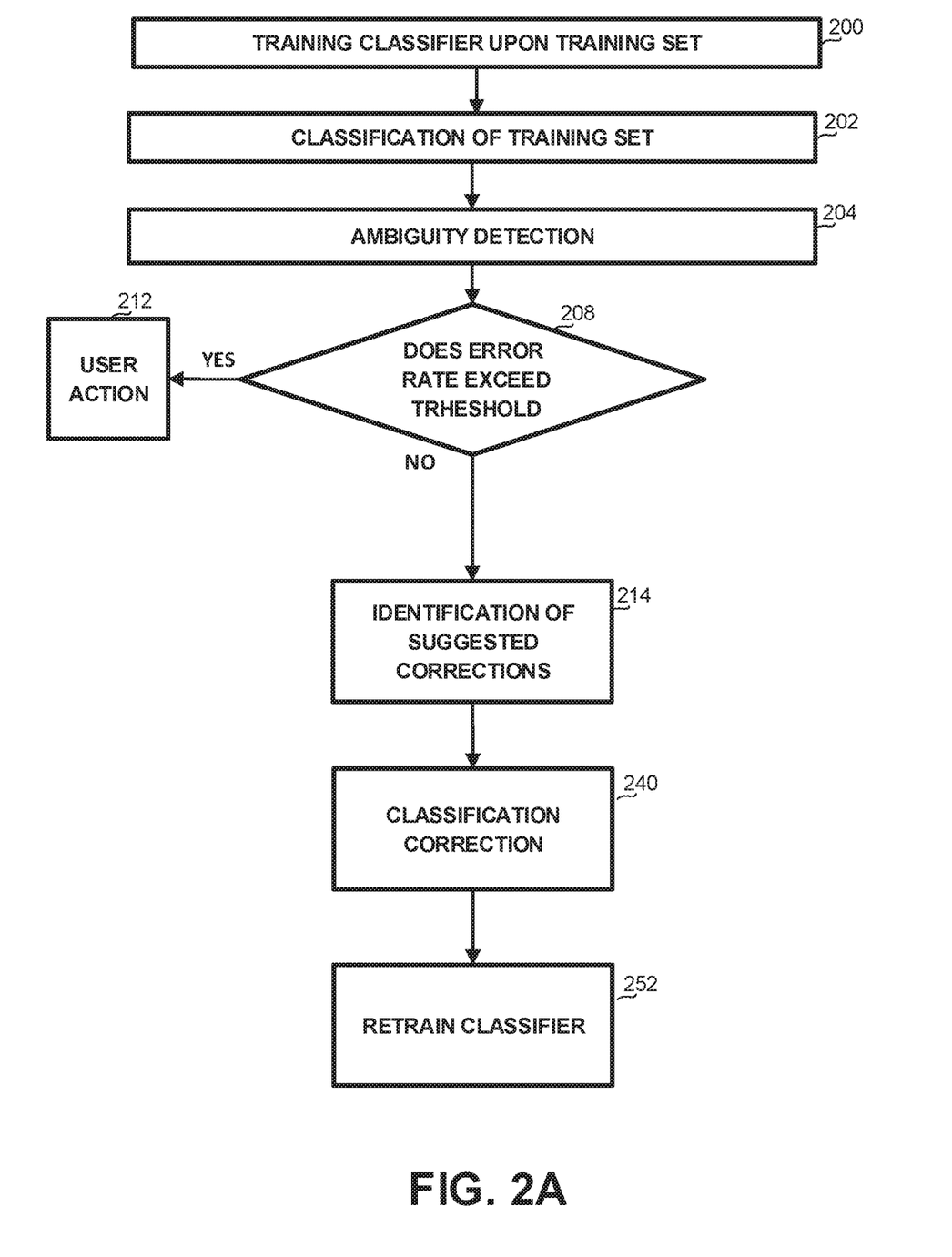
FIG. 2A illustrates a generalized flow-chart of training set generation process, in accordance with certain embodiments of the presently disclosed subject matter.

Referring now to FIG. 2A, showing a generalized flow-chart of a process for generating a training set by misclassification correction, in accordance with certain embodiments of the presently disclosed subject matter.

Classification engine 113 is generated by classifier training module 114 using the training set (200) for training classifier 113. The training set can comprise defects, each characterized by attribute values assigned therewith, and by a classification which can be done by an external source, such as manually classified, classified in an automated manner by using external data such as design data, classified by another classifier, classified using machine learning techniques, or the like.

Classification engine 113 can then be operated to classify (202) the items of the training set, although the same items were used for training the classifier.

Misclassification detection and correction module 115 can then be operated to determine ambiguities (204) of classes. i.e., class pairs in which items are manually classified to one class and automatically classified to another class. The ambiguities are determined based on the classification of the training set, by calculating pairwise classes accuracy scores.

Misclassification correction module 115 can then determine (208) whether the error rate, e.g. the number of erroneous classifications out of all classifications, exceeds a threshold.

If the error rate exceeds the threshold, automatic misclassification correction can be omitted and user action (212) can be required, since not enough correct and useful data can be assumed to exist. User action can include the user reviewing the manual classification since the current training set cannot be used for providing reliable classifications. Another user action can relate to amending the attributes since the available attributes do not provide for satisfactory separation between the classes.

If the error rate is below the threshold, then misclassification correction can be performed.

Misclassification detection and correction module 115 can then identify suggested corrections to the manual classification, i.e., the manual classification of which errors should be changed to comply with the automatic classification.

Misclassification detection and correction module 115 can then correct the manual classification (240) of the misclassified defects.

After the classification of one or more misclassified defects have been corrected, classifier training module 114 can re-train (252) the classifier based on the corrected training set.

Figure 2B:
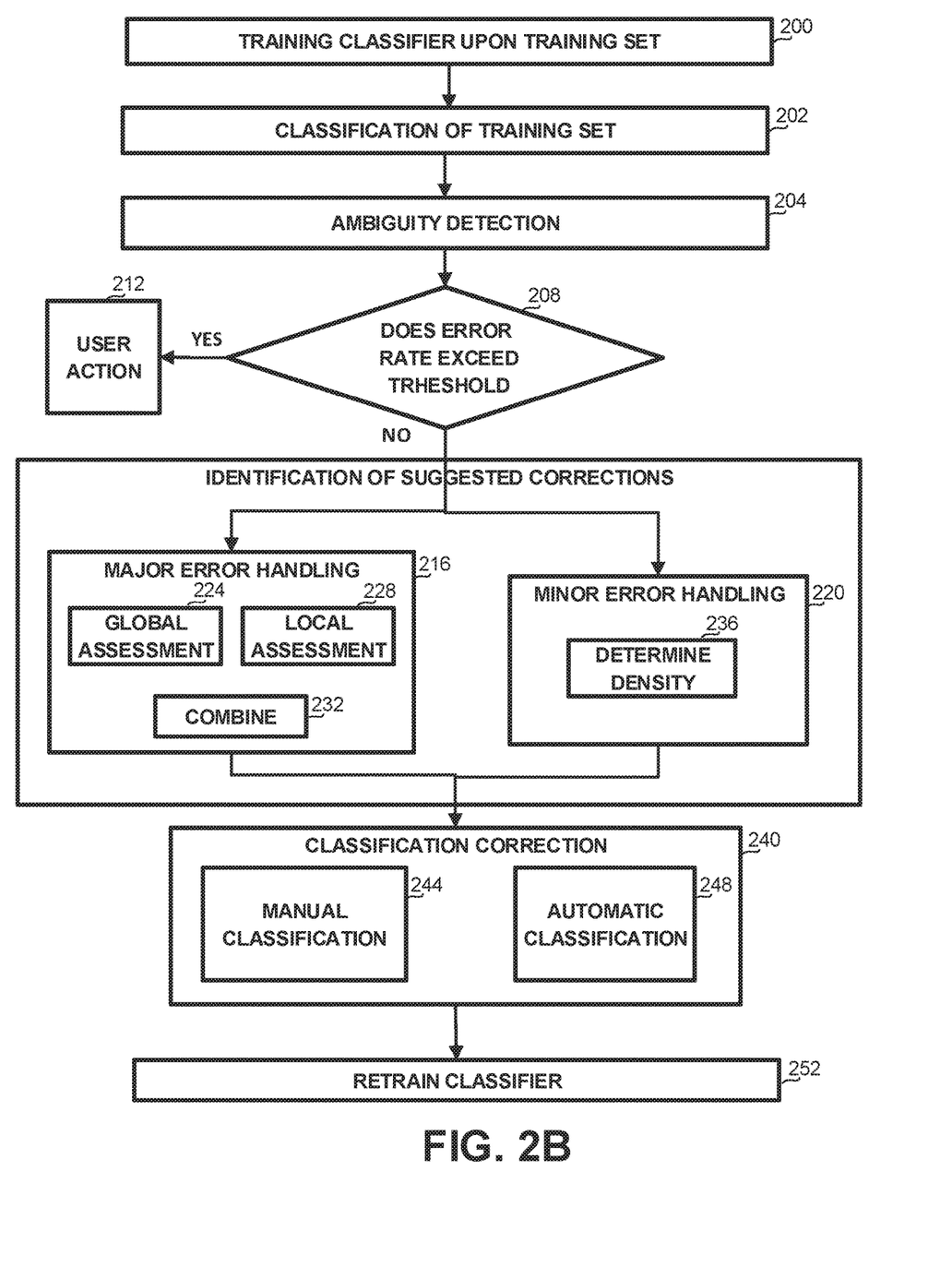
FIG. 2B illustrates the flow-chart of classifier generation process in more detail, in accordance with certain embodiments of the presently disclosed subject matter.

Referring now to FIG. 2B, showing a more detailed flow-chart of the process of FIG. 2A.

Training the classifier (200) and automatically classifying the training set (202) are substantially as described in association with FIG. 2A above.

Misclassification detection and correction module 115 can then determine ambiguities (204) of classes, based on the classification of the training set, by calculating pairwise classes accuracy scores.

In many classification problems, and particularly in object examination, the classes include major classes for which enough data exists since a multiplicity of items are classified into each such class, and minor classes for which insufficient training data is available, such that the classifier will not classify further items into these classes. It will be appreciated that the term enough in this context can refer to a minimal number of items, to at least a predetermined percentage of the cases, a combination thereof, or any other measure.

Thus, misclassification errors may be of two types: an item manually or externally (hereinafter referred to as manually) classified to a first major class which was automatically classified by classification engine 113 to a second major class (referred to as "major error"), and an item manually classified to a minor class which was automatically classified by classification engine 113 to a major class (referred to as "minor error"). It will be appreciated that since not enough data exists for minor classes, no items, or an insignificant number of items are classified to a minor class, thus no other type of errors has to be considered. Identifying misclassification errors and their types is further detailed in association with FIG. 3 below. Determining ambiguities (204) relates to identifying the class pairs involved in errors.

Checking the error rate (208) and requiring user action (212) are substantially as described in association with FIG. 2A above.

If the error rate is below the threshold, then misclassification correction can be performed. Thus, misclassification detection and correction module 115 can identify suggested corrections to the manual classification, i.e., the manual classification of which errors should be changed to be the same as the automatic classification.

Misclassification detection and correction module 115 can handle classification errors according to the type of each such error. Thus, misclassification detection and correction module 115 can handle major errors (216) and minor errors (220).

As part of major error handling (216) in which a defect has been manually assigned to a first major class and automatically assigned to a second major class, misclassification detection and correction module is available performs global assessment (224) and local assessment (228) for each such defect.

A classification can be viewed as a collection of planes in the space defined by the attributes of the defects, wherein the planes separate between different classes.

Thus, global assessment (224) determines the effect of a major error on the separating planes, i.e., how much the classification would have changed if the defect was manually assigned to the second class. The global assessment is further detailed in association with FIG. 4 below.

For those defects that have non-zero effect on the planes, a local assessment (228) is determined, which assesses the percentage of defects out of the K defects nearest to the defect being handled, which have been manually assigned to the second major class, wherein K is a predetermined integer. This assessment provides a confidence level that the defect was indeed mistakenly assigned to the first major class. It will be appreciated that neighboring relates to distance between defects, wherein the distance is calculated in the attribute space. The local assessment is further detailed in association with FIG. 5 below.

Misclassification detection and correction module 115 can then combine (232) the global and local assessments, to obtain a combined grade, which can constitute a misclassification confidence level for a defect of a major error type. Combining the global and local assessments is further detailed in association with FIG. 6 below.

As part of minor error handling (220) in which a defect has been manually assigned to a minor class and automatically assigned to a first major class, misclassification detection and correction module 115 can perform density determination (236) of the defects in the vicinity of the handled defect. A defect that should be assigned to a minor class is generally expected to be in a sparse area, thus a minor defect in a dense area is more likely to be rightfully automatically assigned to a major class, and thus misclassified by the manual classification. The density can thus be used as a misclassification confidence level for a defect of the minor error type.

Misclassification detection and correction module 115 can then correct the manual classification (240) of the misclassified defects. Misclassification detection and correction module 115 can operate in automatic mode (248) in which misclassified defects are automatically re-classified, or in manual mode (244) in which the misclassified defects are presented to a user who can accept the change, reject the change or choose another action, such as classifying the defect to yet a third class. The defects can be presented to a user in decreasing order of confidence level, and presentation can be limited to a predetermined number or percentage of the misclassified defects. The defects can be presented to a user with one or more associated images.

After the classification of one or more misclassified defects have been corrected, either automatically or manually, classifier training module 114 can re-train (252) the classifier based on the corrected training set.

Figure 3:
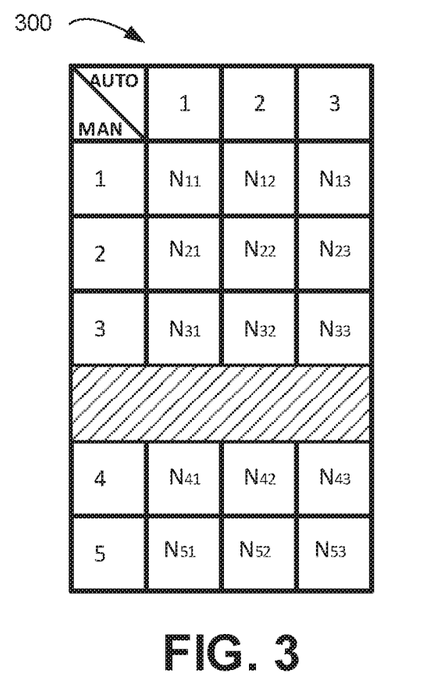
FIG. 3 illustrates a confusion matrix used in analyzing classification results, in accordance with certain embodiments of the presently disclosed subject matter.

Referring now to FIG. 3, showing an exemplary confusion matrix, in accordance with some examples of the subject matter.

Confusion matrix 300 can be used for ambiguity detection (204). Confusion matrix 300 comprises a row for each of the classes defined for the classification. Exemplary rows 1, 2, and 3 refer to major classes for which the classifier has been trained over a sufficient number of examples, while rows 4 and 5 refer to minor classes for which insufficient number of examples had been provided for training. The term sufficient can refer to an absolute number of examples, to a number of examples associated with the number of attributes, to a certainty degree provided by the training module, to the possible values for one or more attributes, or the like.

Confusion matrix 300 comprises a column for each class into which items, e.g., defects from the training set have been classified.

Each entry in confusion matrix 300 comprises an integer number indicating the number of items from the training set which were manually classified to the class associated with the corresponding row, and automatically classified by the classifier to the column associated with the corresponding column. It will be appreciated that due to the insufficient number of examples for minor classes, items are not classified to these classes, therefore confusion matrix 300 comprises fewer columns than rows. It will also be appreciated that the numbers along the main diagonal: $A_{11}, A_{22} \ldots A_{NN}$ represent the number of correctly classified defects, while the other entries represent the number of erroneously classified defects.

The pairwise score for any two major classes i and j can be determined as follows $$ACC_{ij} = \left(\frac{N_{ii}}{N_{ii}+N_{ij}} * \frac{N_{ii}}{N_{ii}+N_{ji}} * \frac{N_{jj}}{N_{jj}+N_{ji}} * \frac{N_{jj}}{N_{ij}+N_{jj}}\right)^{0.25} \text{ or}$$

$$ACC_{ij} = \left(\frac{N_{ii}+N_{jj}}{N_{ii}+N_{ij}+N_{jj}+N_{ji}}\right)^{0.25}$$

i.e., the geometric or the algebraic average of each class' precision and recall values between the two classes. The pairwise accuracy can then be smoothed and set to a value between 0 and 1, for example using a sigmoid as follows:

$$S_{ij} = \left(1 + \exp\left\{-\frac{ACC_{ij} - \mu}{\sigma}\right\}\right)^{-p},$$

wherein µ, σ and p are parameters, for example µ=0.75, σ=0.05 and p=1. It will be appreciated that the pairwise score can be determined in other manners as well.

The obtained pairwise scores can then be compared against a threshold, such that all class pairs i and j for which $S_{ij}$ is below the threshold are considered ambiguous, and cross classifications therebetween can be examined.

If a combination of all pairwise scores, for example an average, exceeds a threshold, the error rate of the classification can be considered unsatisfactory and user action (212) can be requested.

It will be appreciated that the disclosed confusion matrix and calculations are exemplary only, and other methods or data structures can be used for assessing the classifier accuracy.

Figure 4:
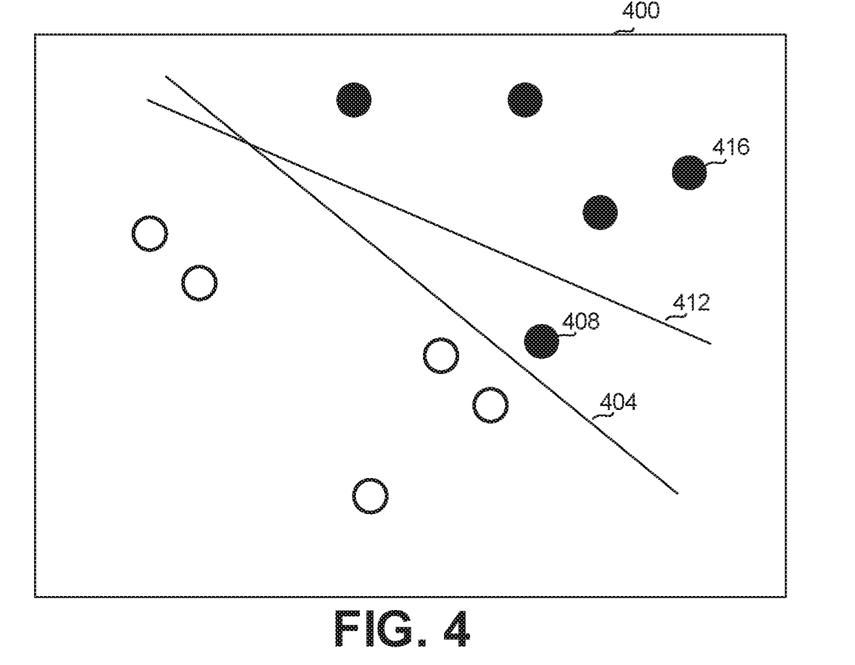
FIG. 4 shows an illustrative example of the global effect of misclassification of a defect, in accordance with certain embodiments of the presently disclosed subject matter.

Referring now to FIG. 4, demonstrating the global effect of a misclassification of a major error. FIG. 4 shows a distribution of two-dimensional points into two classes. The points include the hollow points which are manually classified to one class, and the full round points which are manually classified to another class. The separation line between the groups, indicating the separation line between the classes was determined to be line 404. However, if point 408 was misclassified and had been a hollow point, then the separation line would have probably moved to line 412.

On the other hand, if point 416 was misclassified and had been a hollow point, then the separation line would have probably not moved since this would imply significant blending between the points classified to the different classes. Thus, point 408 can have a higher effect on the classification than point 416.

It will be appreciated that the example of FIG. 4 is simplified, as it shows classification of two-dimensional items, while defects can have a significantly larger number of attributes, which can be in the order of magnitude of hundreds or thousands. Thus, the separation between classes is not a line but a multi-dimensional plane. Secondly, the example of FIG. 4 shows classification into two classes only, while defects can be classified into a higher number of classes, such as tens or hundreds. Even further, each defect can affect at least the planes separating its class from other classes. Thus, a defect classified to class A can affect the separation planes between class pairs A-B, A-C, etc.

The effect of each misclassified defect $x_i$, referred to as Alpha can thus be computed as the sum of its effect over all separation planes between the class it was assigned to and other classes: $\alpha(i) = \Sigma_{j \in MulticlassGames} \alpha_{j,x_i}$ wherein Multi class games is the group of all separation planes between the class of $x_i$ and other classes, and $\alpha_{j,x_i}$ can be determined as the Linear Support Vector Machines (LSVM) weight of defect $x_i$ in the multiclass game j. W can be defined as $w = \Sigma_{i=1}^{L} \alpha_i y_i X_i$ wherein $y_i$ and $x_i$ are the corresponding class label and attribute values, and the objective is to determine α so as to minimize min½$\|w\|^2 + C\Sigma_{i=1}^{L}\xi_i$ such that $y_i(X_i \cdot w + b) - 1 + \xi_i \geq 0$ ∀i.

Figure 5:
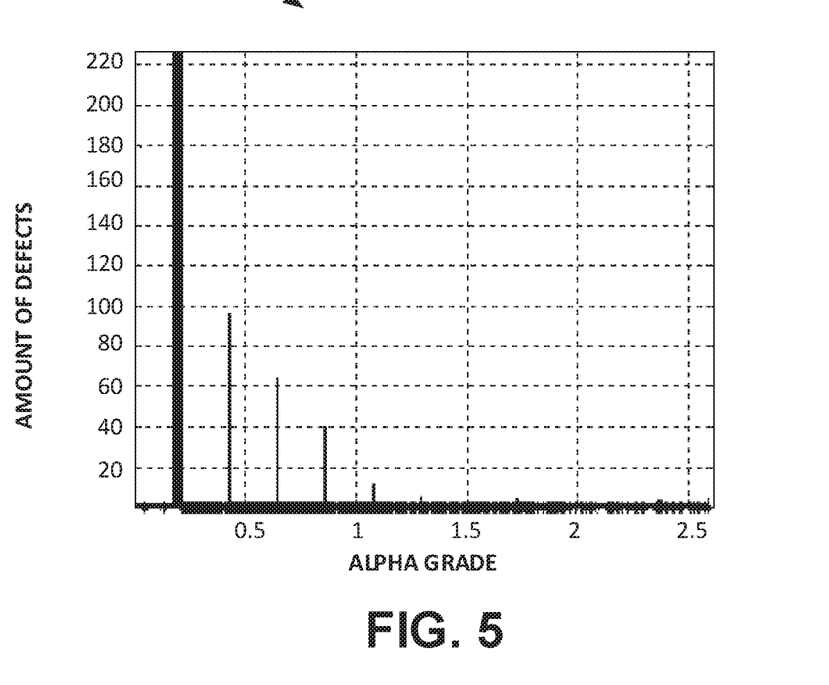
FIG. 5 is a histogram of the amount of misclassified defects for each alpha grade, in accordance with certain embodiments of the presently disclosed subject matter.

Referring now to FIG. 5, showing histogram 500 of the amount of misclassified defects for each alpha grade. It is seen that most misclassified defects have zero alpha grade, thus their misclassification does not affect the separation plane, as demonstrated for point 416 of FIG. 4 above. It will be appreciated that the defects having a higher grade are those closer to the separation planes, since changing their classification can change the separation planes.

Figure 6:
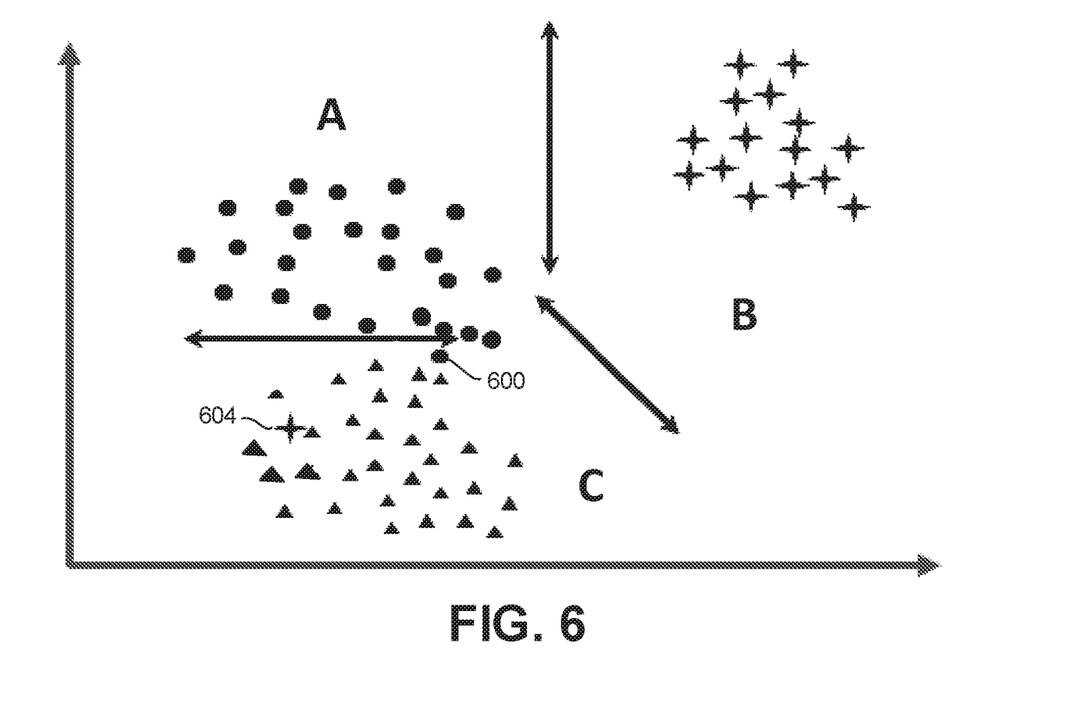
FIG. 6 provides a demonstration of the calculation of confidence level of misclassification for each major error classified differently by the manual and automatic classifications, in accordance with certain embodiments of the presently disclosed subject matter.

Referring now to FIG. 6, demonstrating the calculation of confidence level of misclassification for each major error classified differently by the manual and automatic classifications. The shape of each item (star, circle, triangle) is indicative of its manual classification, while the lines show the separation planes between the classes in the automatic classification. Thus, items 600 and 604 are automatically classified to class C, although item 600 is close to other points similar to it which were automatically classified to class A, while point 604 is different from its neighbors.

It will be appreciated that the confidence level can be calculated only for those defects that had a positive alpha grade, i.e., changing their manual classification in the training set would affect the automatic classification.

Thus, a measure of confidence level that a point is misclassified can be termed K nearest neighbors (KNN) and defined as follows: how many out of the K neighbors nearest to a defect X (in the attribute space) are manually classified to a different class from defect X.

For example, suppose K=6, then out of the 6 items nearest to item 600, 4 (the 4 circles) are manually classified to the same class and 2 (the two stars) are classified to a different class, therefore the confidence level of a mistake is ⅔=⅓. Out of the 6 points closest to point 604, all are of different type, thus the confidence level is 6/6=1, and point 604 is much more likely to be a misclassification error than point 600. In some examples, K can be selected to be the square root of the number of the defects in the training set.

Figure 7:
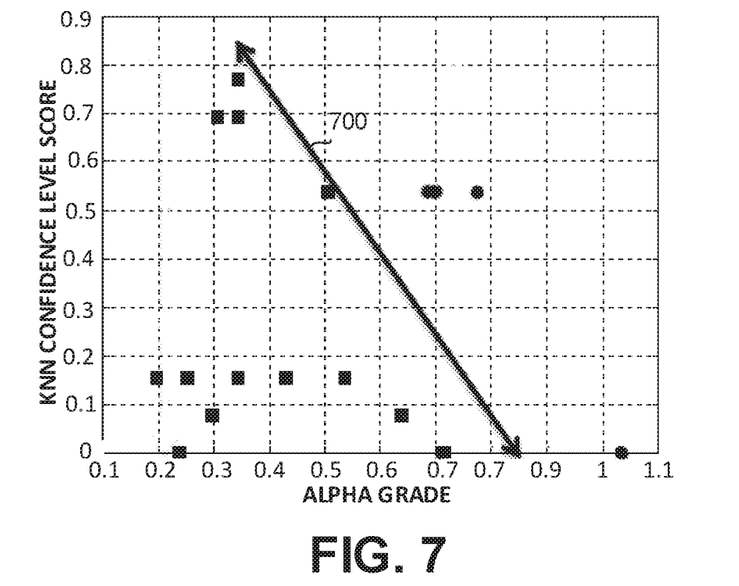
FIG. 7 demonstrates combining the global and local effects into a single indicator of a defect classified into two different major classes by the manual and automatic classifications, in accordance with certain embodiments of the presently disclosed subject matter.

Referring now to FIG. 7, demonstrating how the global and the local effect can be combined into a single indicator of a defect classified into two different major classes by the manual and automatic classifications. Each defect is indicated as a point on an axis system, having one axis representing the alpha grade of the defect, and the other axis representing the KNN grade, being the confidence level. Line 700 is set such that the points to its right and top are more likely to represent misclassifications, since they have significant effect on the separation planes, and have high confidence level of being misclassifications. These points will thus be corrected or suggested to the user to correct.

It will be appreciated that correcting all points will cause over-fitting, i.e. perfect fitting of the classification to the specific training set, which is likely to introduce more errors when classifying other defects. As line 700 is moved such that more points are to its right and top side, more false alarms are likely to occur, i.e. defects that have been manually classified correctly and will now (at least in the automatic mode) be classified incorrectly. However, setting line 700 such that more points are to its left and bottom will miss more required misclassifications and is likely to introduce lesser improvement to the classification. If manual correction is performed, the setting of line 700 can be selected such that the number of defects to the right and top is substantially equal to the number of classifications that can be performed by a user. If automatic correction is performed, the line should be set in accordance with a risk level a user is willing to take.

Figure 8:
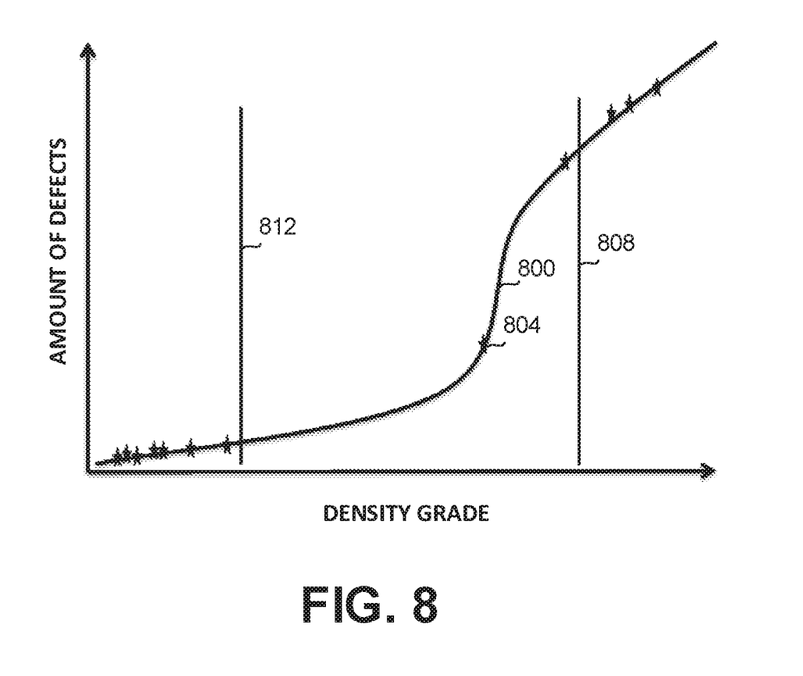
FIG. 8 shows a density graph for the minor error defects, in accordance with certain embodiments of the presently disclosed subject matter.

Referring now to FIG. 8, showing a density graph for the minor error defects, which can be used for determining misclassification of minor errors.

For each minority error, i.e., a training set defect manually classified to a minor class and automatically classified to a major class, the density of defects in its vicinity is determined. The underlying assumption is that a true minority defect lies in a sparse area. Thus, if a defect manually classified as a minority is at a dense area, there is relatively high likelihood that it is a misclassification error and should have been classified to a majority class.

For example, if a minority error is within close proximity (in attribute space) to multiple defects classified to a major class, the classification will be deficient since in order for the misclassified defect not to be classified to that class, multiple other defects that are correctly classified to the class, will be misclassified and will require user review. By changing the classification of the particular minority error, this situation can be avoided, thus providing significant improvement since fewer possible misclassifications will be present.

The density can be determined using any desired method, such as but not limited to Kernel Density Estimation (KDE).

In FIG. 8 every marked point such as point 804 indicates a density and the number of training set defects classified as the minority class and having this density. It will be appreciated that the specific defects associated with each such point are known. Graph 800 of FIG. 8 connects the points. It will be appreciated that the graph is exemplary only, but its shape is typical, since the classes are typically distributed as Gaussians, such that when density is calculated the graph assumes this shape.

For each such graph, a vertical line can be drawn, such that the points to the right of the line are those associated with high density, and thus have higher probability of representing misclassified defects. Drawing the line at a higher density value, such as line 808, provides for low risk and higher stability, since only the defects that are most likely misclassified will be reclassified. However, such threshold can mean that many misclassifications will not be corrected.

However, drawing the line at a lower density value, such as line 812 can provide for over-correction and over fitting. Over fitting can yield significant improvement in classifying the training set, but this improvement will not be yielded for general defects, such that runtime performance will not be improved but can even degrade.

Thus, the density value at which the line is drawn can depend on the specific application: how much the training set is assumed to represent the general case, the cost of false positive expected when drawing the line at too low density value vs. the cost of missing out minority defects.

The following terms are useful in assessing the effectiveness of the disclosed method and apparatus.

"Minority extraction" indicates the number of minor errors that are assigned to columns that are manually reviewed, out of all the minority defects, i.e., the percentage of minority defects that are at least considered as misclassification errors.

"Contribution gain" indicates the possible saving in the manual review required due to re-classification of a minority. For example, if a minority error is within close proximity (in attribute space) to multiple defects classified to a major class, the manual classification can be problematic since in order for the defect not to be classified to that major class, multiple other defects will be misclassified and will require user review. By changing the classification of the particular defect to the major class this situation can be avoided, thus providing significant gain, since fewer possible misclassifications will be present.

Misclassification of a minority which is far from other defects will not cause misclassification of a significant number of other defects, and thus its contribution gain is lower.

Figure 9:
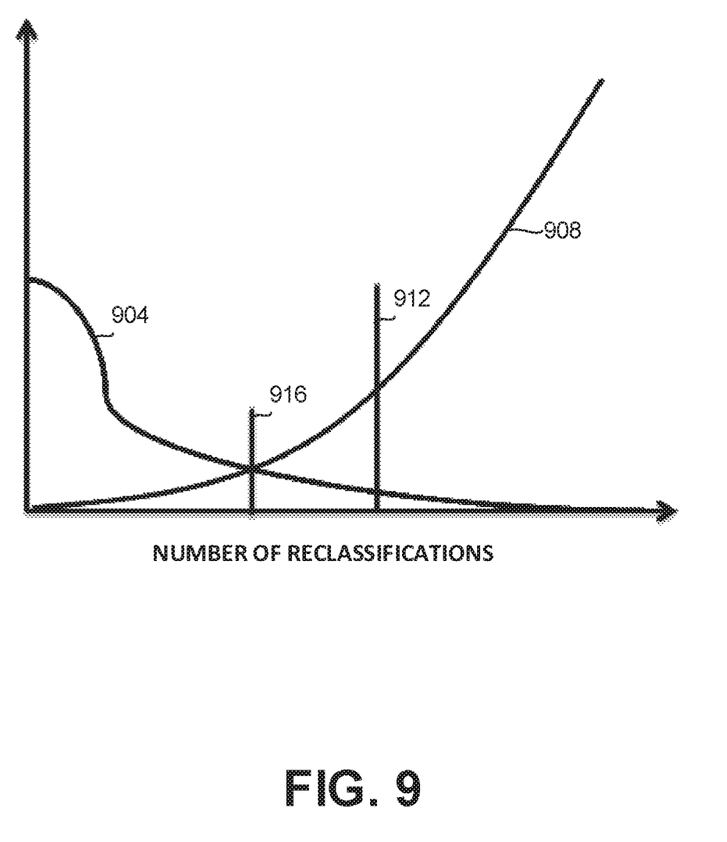
FIG. 9 provides a visual demonstration of considerations into a cost function for minor defect corrections, in accordance with certain embodiments of the presently disclosed subject matter.

Referring now to FIG. 9, showing a combination of the considerations into a cost function for minor defect corrections.

Graph 904 shows the decline in remaining contribution gain as the number of reclassification increases, which indicates that lesser improvement can be expected from re-classifying further defects. Graph 908, however, shows the increased stability risk associated with re-classifying more defects. Line 916 indicates a point in which the sum of the two factors is minimal, however any other line can be selected if one factor is more important than the other. Once a vertical line is selected, which indicates a number of reclassifications the user is willing to make, that number of the defects having the highest densities are reclassified, while the others are not.

Experimental Results

A system in accordance with the disclosure has been used in automatic mode, including:

1. Setting a threshold as shown by line 700 of FIG. 7 for determining which major error misclassifications are to be automatically re-classified. The system performed close to a human expert, in terms of:

Stability, i.e. the number of minorities that were removed from being classified to major classes, due to the reclassification of the major misclassification errors: this number was consistent between the training set and a testing set.

Performance: the contribution gain drops as the minority extraction increases.

2. Setting a threshold as shown in line 916 of FIG. 9, indicating the number of minor error misclassifications to be reclassified. Stability was better than in case (1) above, however performance was deficient.

Thus, correcting major misclassifications in accordance with the disclosure provides significant improvement, while correcting both major and minor misclassifications provides even better results.

The results are significantly better than automatically replacing 100% of the misclassified defects.

It will be appreciated that the disclosure is not limited to classifying defects and can be used for any classifier of items in any field.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the invention can be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. An examination system comprising:
 a review tool that reviews at least part of potential defects of an examined object, and assigns each of the at least part of the potential defects with a multiplicity of attribute values; and
 a computer-based classifier, coupled to the review tool, to classify, based on the attribute values as assigned, the at least part of potential defects into a set of classes, the set comprising at least a first major class, a second major class and a first minor class, the classifier trained based on a training set comprising a multiplicity of training defects with assigned attribute values, the training defects classified into the set of classes.

2. The examination system of claim 1 wherein during a training mode, the classifier is configured to:
 automatically classify the multiplicity of training defects into the set of classes based on the respectively assigned attribute values;
 automatically identify at least one first defect from the multiplicity of training defects that was externally classified into the first major class and classified by the classifier into the second major class;
 automatically identify a second defect from the multiplicity of training defects that was externally classified into the minor class and classified by the classifier to a class selected from the first major class and the second major class; and
 correct the training set to include the at least one first defect into the second major class or to include the second defect into the first major class or the second major class.

3. The system of claim 1, wherein the classifier is comprised in the review tool.

4. The system of claim 1, wherein classification of the training defects is done automatically.

5. The system of claim 1, wherein the classifier is further configured to be retrained using the corrected training set.

6. The system of claim 1, wherein the classifier is further configured to provide indications to a user regarding the least one first defect or the second defect, and receive from the user classification of the least one first defect to the second major class or classification of the second defect to the first major class or to the second major class.

7. The system of claim 6, wherein the indications are provided along with an image of the least one first defect or the second defect.

8. A non-transitory computer readable storage medium comprising instructions, which when executed by a processor, cause the processor to:
 review at least part of potential defects of an examined object, and assign each of the at least part of the potential defects with a multiplicity of attribute values; and
 classify, based on the attribute values as assigned, the at least part of potential defects into a set of classes, the set comprising at least a first major class, a second major class and a first minor class, wherein the processor is to classify the at least part of potential defects using a classifier trained based on a training set that comprises a multiplicity of training defects with assigned attribute values, the training defects classified into the set of classes.

9. The computer readable storage medium of claim 8 wherein during a training mode, the classifier is configured to:
 automatically classify the multiplicity of training defects into the set of classes based on the respectively assigned attribute values;
 automatically identify at least one first defect from the multiplicity of training defects that was externally classified into the first major class and classified by the classifier into the second major class;
 automatically identify a second defect from the multiplicity of training defects that was externally classified into the minor class and classified by the classifier to a class selected from the first major class and the second major class; and
 correct the training set to include the at least one first defect into the second major class or to include the second defect into the first major class or the second major class.

10. The computer readable storage medium of claim 8, wherein the classifier is comprised in a review tool.

11. The computer readable storage medium of claim 8, wherein classification of the training defects is done automatically.

12. The computer readable storage medium of claim 8, wherein the classifier is further configured to be retrained using the corrected training set.

13. The computer readable storage medium of claim 8, wherein the classifier is further configured to provide indications to a user regarding the least one first defect or the second defect, and receive from the user classification of the least one first defect to the second major class or classification of the second defect to the first major class or to the second major class.

14. The computer readable storage medium of claim 13, wherein the indications are provided along with an image of the least one first defect or the second defect.

15. A method comprising:
 reviewing at least part of potential defects of an examined object, and assigning each of the at least part of the potential defects with a multiplicity of attribute values; and
 classifying, based on the attribute values as assigned, the at least part of potential defects into a set of classes, the set comprising at least a first major class, a second major class and a first minor class, wherein the at least part of potential defects is classified using a classifier trained based on a training set that comprises a multiplicity of training defects with assigned attribute values, the training defects classified into the set of classes.

16. The method of claim 15, further comprising training the classifier, during a training mode, the training comprising:
 automatically classifying the multiplicity of training defects into the set of classes based on the respectively assigned attribute values;
 automatically identifying at least one first defect from the multiplicity of training defects that was externally classified into the first major class and classified by the classifier into the second major class;
 automatically identifying a second defect from the multiplicity of training defects that was externally classified into the minor class and classified by the classifier to a class selected from the first major class and the second major class; and
 correcting the training set to include the at least one first defect into the second major class or to include the second defect into the first major class or the second major class.

17. The method of claim 15, wherein the classifier is comprised in a review tool.

18. The method of claim 15, wherein classification of the training defects is done automatically.

19. The method of claim 15, further comprising:
providing indications to a user regarding the least one first defect or the second defect; and
receiving from the user classification of the least one first defect to the second major class or classification of the second defect to the first major class or to the second major class.

20. The method of claim 15, wherein the indications are provided along with an image of the least one first defect or the second defect.

* * * * *